US009697532B2

(12) United States Patent
Kilchenman et al.

(10) Patent No.: US 9,697,532 B2
(45) Date of Patent: Jul. 4, 2017

(54) INTEGRATED PLATFORM EMPLOYEE TRANSACTION PROCESSING FOR BUY YOUR OWN DEVICE (BYOD)

(71) Applicant: Cellco Partnership, Basking Ridge, NJ (US)

(72) Inventors: Timothy Kilchenman, Wilmington, NC (US); Cynthia J. Harris, Gahanna, OH (US)

(73) Assignee: Cellco Partnership, Basking Ridge, NJ (US)

( * ) Notice: Subject to any disclaimer, the term of this patent is extended or adjusted under 35 U.S.C. 154(b) by 649 days.

(21) Appl. No.: 14/193,767

(22) Filed: Feb. 28, 2014

(65) Prior Publication Data

US 2015/0248686 A1 Sep. 3, 2015

(51) Int. Cl.
*G06Q 30/02* (2012.01)
*G06Q 30/06* (2012.01)
*G06Q 20/40* (2012.01)

(52) U.S. Cl.
CPC ......... *G06Q 30/0207* (2013.01); *G06Q 20/40* (2013.01); *G06Q 30/0635* (2013.01)

(58) Field of Classification Search
CPC ............ G06Q 30/0601; G06Q 30/0635; G06F 21/6245; H04L 9/302; H04L 9/3249
See application file for complete search history.

(56) References Cited

U.S. PATENT DOCUMENTS

| | | | | |
|---|---|---|---|---|
| 6,167,383 A * | 12/2000 | Henson | ................ | G06Q 10/087 703/13 |
| 2005/0097060 A1* | 5/2005 | Lee | ........................ | G06Q 20/02 705/65 |
| 2008/0195506 A1* | 8/2008 | Koretz | ............... | G06Q 30/0603 705/26.1 |
| 2010/0297466 A1* | 11/2010 | Patrick | ...................... | E04B 5/40 428/603 |
| 2011/0028124 A1* | 2/2011 | Sprague | ................ | H04M 15/00 455/406 |

(Continued)

OTHER PUBLICATIONS

"The Catholic University of America, Policies, Finance: Accounting, Employee Cell Phones for Business Use", Oct. 21, 2011.*

*Primary Examiner* — Joseph D Burgess

(57) ABSTRACT

Secure associate ordering and transaction methods and systems. An order for an alternative device different from a baseline device is received at an order processing platform. The alternative device is available for purchase by the associate at a cost differential between the alternative and baseline devices. The cost differential is based on a predetermined enterprise discount. A message including a secure link associated with the order is sent to the associate. Payment information associated with the cost differential is received by a secure payment (SP) platform from the associate via a secure website using the secure link. The payment information is submitted to a payment institution. The order processing platform receives a transaction confirmation from the SP platform when the payment information is accepted and adds at least features of the alternative device associated with the baseline device to a service account of the enterprise customer for the service provider.

20 Claims, 9 Drawing Sheets

(56) References Cited

U.S. PATENT DOCUMENTS

2011/0264555 A1* 10/2011 Turner-Rielle ........ G06Q 30/06
                                                705/26.8
2012/0302204 A1   11/2012 Gupta et al.
2013/0095785 A1    4/2013 Sadana et al.
2014/0095334 A1*  4/2014 Barton ................... G06Q 30/06
                                                705/26.1

* cited by examiner

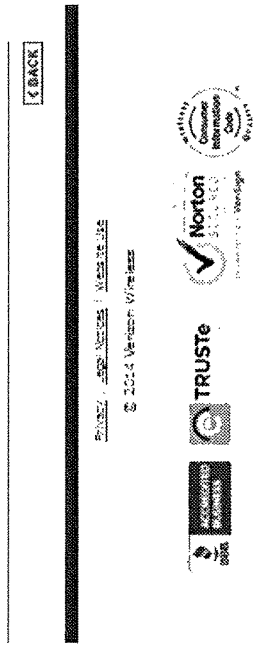
FIG. 7C
FIG. 7E
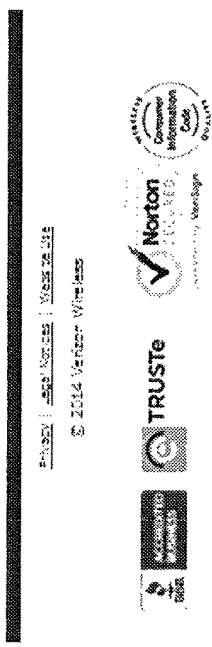
FIG. 7D

INTEGRATED PLATFORM EMPLOYEE TRANSACTION PROCESSING FOR BUY YOUR OWN DEVICE (BYOD)

BACKGROUND

Enterprises may supply employees (as well as other associates) with mobile devices to satisfy the demands of the enterprise. Enterprises, based on their size and mobile connectivity needs, may engage with a mobile communication service provider to create single and multilevel account structures. Thus, enterprises may gain structured discount pricing from the service provider to outfit their employees with approved mobile devices (at the discount pricing). In general, approved baseline mobile devices include hardware features, applications features and/or specific devices of a specific manufacturer which are approved for use by employees of the enterprise. For example, each enterprise may create a portfolio of devices for use by their employees and negotiates specific discount pricing with the service provider for those devices.

With older, more traditional, approaches, the enterprise selected a number of types of baseline mobile devices and approved only those baseline devices for use by employees of the enterprise. Often, the enterprise agreed to pay the purchase price of an approved device for each employee and possibly some or all of the monthly service charges that were expected to be attributable to enterprise related employee communications. This older approach, however, limited the types of devices available to the enterprise employees to only those approved by the enterprise.

Employees that use the approved baseline mobile devices supplied by the enterprise (to satisfy the enterprise demands), however, may also desire access to additional device features (such as more advanced, full featured service offerings and/or device capabilities) or access to different devices than the baseline devices. The cost of these additional features/different devices may not be covered by the enterprise. Employees, however, may be willing to pay for more robust (alternative) devices (i.e., having device features different from the baseline device or being a different device than the baseline device).

A need exists for providing a secure platform for employees to purchase devices alternative to enterprise-approved baseline devices at the enterprise discount.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIGS. 7A, 7B, 7C, 7D and 7E are example screenshots illustrating an example transaction form and various transaction messages that may be provided to the associate during transaction processing.

DETAILED DESCRIPTION OF EXAMPLES

Figure 1:
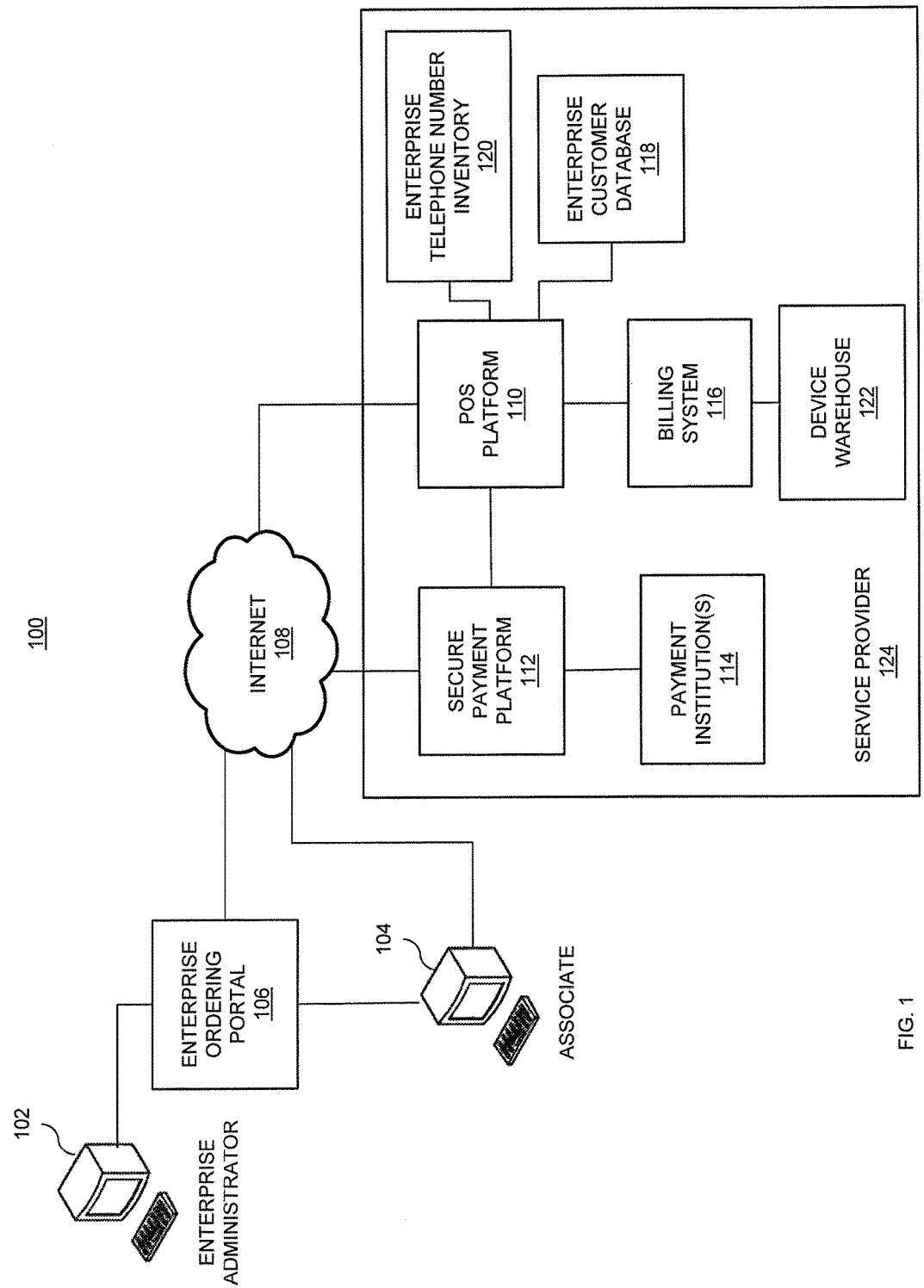
FIG. 1 is a high-level functional block diagram of an example of a system that supports an example of a secure associate BYOD ordering and transaction service.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The various methods and systems disclosed herein relate to a secure buy your own device (BYOD) associate ordering and transaction service. For example, employees may desire additional device features to satisfy their current business needs as well as additional personal and/or social needs. The concept of employees purchasing devices alternative to enterprise-approved baseline mobile devices is referred to herein as buy your own device (BYOD). The negotiated enterprise discount with the service provider for approved baseline mobile device purchases may be applied to the employee purchase of alternative mobile devices. Thus, employees can leverage the enterprise discount for their purchase request, which can significantly lower the purchase price point of the requested alternative device. This discounted price point enables a greater number of employees to take advantage of this purchase offering. Accordingly, a BYOD associate ordering and transaction service allows employees to buy their own (alternative) devices using the enterprise discount when the enterprise will not buy the alternative devices using the enterprise discount.

An order request is received, through a network, at an order processing platform of a mobile communication service provider that is accessible to an enterprise customer of the service provider. The order request is for an associate of the enterprise customer, and includes an order for an alternative mobile device different from a baseline mobile device approved by the enterprise customer. The alternative device is available for purchase by the associate at a cost differential between the alternative mobile device and the baseline mobile device. The cost differential is based on a predetermined enterprise discount. The predetermined enterprise discount may include a discount of the baseline mobile device. In other examples, the predetermined enterprise discount may include the discount of the baseline mobile device combined with an enterprise discount for the alternative mobile device. In other examples, the predetermined enterprise discount may include the discount of the baseline mobile device combined with a generally available discounted device price (e.g., based on a current promotion).

The order processing platform sends, via the network, a message for the associate. The message includes a secure link associated with the order request. Payment information from the associate is received via a secure website using the secure link provided by a secure payment (SP) platform of the service provider that is accessible to the associate. The payment information is associated with the cost differential for the alternative device. The SP platform submits the payment information from the associate to a payment institution. The order processing platform receives a successful transaction confirmation indication from the SP platform when the payment information is accepted by the payment institution. The order processing platform adds at least features of the alternative mobile device associated with the baseline mobile device (such as features subscribed to by the enterprise customer for the baseline mobile device) to a service account of the enterprise customer for the service provider, responsive to the transaction confirmation indication.

In general, the alternative mobile device is available for purchase by the employee at a cost. This cost may be derived based on the alternative device cost (e.g., equipment cost) and application of any applicable enterprise discount(s), as well as any pertinent taxes. The enterprise may or may not pick up the cost for additional services associated with the alternative mobile device, but may not pay for additional services associated with the baseline device (irrespective of the device cost).

Reference now is made in detail to the examples illustrated in the accompanying drawings and discussed below. FIG. 1 illustrates a system 100 offering an approved associate a secure BYOD ordering and transaction service. The system 100 includes an enterprise administrator station 102, an associate station 104, an enterprise ordering portal 106, a point of sale (POS) platform 110, a secure payment (SP) platform 112, one or more payment institutions 114, a billing system 116, an enterprise customer database 118, an enterprise telephone number inventory 120 and a device warehouse 122. Internet 108 provides communications between the enterprise ordering portal 106, the associate station 104, the POS platform 110 and the SP platform 112. Although not shown, the POS platform 110, the SP platform 112, the payment institution(s) 114, the billing system 116, the enterprise customer database 118, the enterprise telephone number inventory 120 and the device warehouse 122 may also be connected by one or more communication networks.

The enterprise ordering portal 106 represents a client-side system which is used by the enterprise administrator station 102 and the associate station 104 for ordering mobile devices including enterprise-approved baseline mobile devices and alternative mobile devices (different from a baseline mobile device). The enterprise ordering portal 106 communicates with the mobile communication service provider 124 to place an order and to receive order status updates. The associate station 104 communicates directly with the service provider 124 (specifically, the SP platform 112), as described below, to perform transaction processing for the order. In FIG. 1, the POS platform 110, the SP platform 112, the payment institution(s) 114, the billing system 116, the enterprise customer database 118, the enterprise telephone number inventory 120 and the device warehouse 122 are illustrated as an example of the service provider 124. Although not shown, in some examples, the service provider 124 may also receive orders from POS terminals in addition to/or separate from the enterprise ordering portal 106. In general, the POS platform 110 represents an order processing platform of the service provider 124.

For simplicity, FIG. 1 illustrates one enterprise administrator station 102 and one associate station 104. It is one or more enterprise administrator stations 102 and/or one or more associate stations 104 may be connected to enterprise ordering portal 106.

The enterprise ordering portal 106 is configured to allow associates (such as an associate using associate station 104) to select and order alternative mobile devices that are different from enterprise-approved baseline mobile devices. A cost differential between the alternative mobile devices and the baseline mobile devices may not be covered by the enterprise. However, the alternative mobile device may be available for purchase by the associate at the cost differential via the enterprise ordering portal 106. The cost differential may be based on an enterprise discount from the service provider 124. Thus, the associate may be able to configure a BYOD-type mobile device via the enterprise ordering portal 106. In turn, at least some features of the alternative mobile device may be added to a service plan account of the enterprise (a customer of the service provider 124). The features that are added (and paid for by the enterprise) to the enterprise's service plan account may be features associated with the baseline mobile device (such as features subscribed to by the enterprise customer for the baseline mobile device). In some examples, additional service features offered by the alternative mobile device are provided to the employee at the predetermined enterprise discount.

The enterprise may be any company, firm, organization, government entity, etc. The enterprise-approved mobile devices may include, without being limited to, mobile phones, portable handsets, smart-phones, personal digital assistants, satellite positioning system (SPS) devices, devices with a wireless connection (e.g., a home appliance with a cellular connection), etc. The alternative device may include additional device capabilities and/or additional service offerings. The additional features may be related to business needs (for example, an SPS device useful for visiting clients) and/or personal needs (for example, a social networking application for personal communication) of the associate. For example, the alternative device may include an additional hardware feature (e.g., additional memory), an additional application feature (e.g., a music listening program) or at least one improved feature included in the baseline mobile device (such as a newer/better processor or display). As another example, the alternative device may be the same type of device as the baseline mobile device but manufactured by a different manufacturer. In some examples, different additional features may have different enterprise discounts (e.g., a device may have a different discount from a device accessory).

In one example, the enterprise ordering portal 106 is associated with a particular enterprise, such as with a particular business or organization. In another example, the enterprise ordering portal 106 is associated with more than one enterprise, and may have multiple enterprise interfaces (such as the enterprise interface 202 shown in FIG. 2) for selecting and ordering alternative (and baseline) mobile products from the service provider at the corresponding enterprise discount pricing. In some examples, the enterprise ordering portal may include a telephone expense management (TEM) client application that may be operated by a third-party (rather than the enterprise). The enterprise ordering portal 106 is discussed further below with respect to FIG. 2.

The enterprise ordering portal 106 is configured to be accessed by an associate of the enterprise, such as via the associate station 104. In general, the associate may include an employee, a business partner, an agent, a consultant or a volunteer associated with the enterprise. In particular, the associate includes any individual working or volunteering for the enterprise where the enterprise intends to provide a mobile device for the enterprise to the individual. The associate may review the pricing of various additional device features and may place an order request for one or more additional device features via the enterprise ordering portal 106. As described further below, the associate may also receive a secure link via the enterprise ordering portal 106 for purchasing the additional device features in an (enterprise-administrator) approved order request. The associate, via the associate station 104, may use the secure link to perform transaction processing for the approved order request via the SP platform 112. The enterprise ordering portal 106 may also be accessed by the associate to review the order status of a pending order.

The enterprise ordering portal 106 is configured to be accessed by an administrator of the enterprise, such as via the enterprise administrator station 102. The administrator may review proposed orders by the associate and provide instructions to the enterprise ordering portal 106 for disposing of the proposed order. For example, the administrator may approve or disapprove of the proposed associate order. Based on the administrator's disposition instructions (as well as the associate's instructions as to whether to proceed with the order), the enterprise ordering portal 106 instructs the POS platform 110 whether to proceed with the proposed order.

The enterprise administrator station 102 and the associate station 104 may be of any type. For example, they may be smart phones, laptops, desktop computers, personal digital assistants, netbooks or tablet computers.

The POS platform 110 is configured to communicate with the enterprise ordering portal 106, the SP platform 112, the billing system 116, the enterprise customer database 116, the enterprise telephone number inventory 120 and the device warehouse 122. The POS platform 110 is configured to provide pricing requests (e.g., cost differentials) for alternative devices (for example, at enterprise pricing discounts) received from the enterprise ordering portal 106, to review order requests submitted by the enterprise ordering portal 106 and to provide a secure link to the enterprise ordering portal 106 for the associate to complete transaction processing for the pending order request.

The POS platform 110 is also configured to communicate with the SP payment platform in order to generate the secure link and to confirm successful transaction processing (by the associate with the SP platform 112). Responsive to successful transaction processing, the POS platform 110 instructs the billing system 116 to complete the order processing and provides suitable reference information to the billing system 116 to complete the order processing (e.g., order content information). The POS platform 110 may also provide order status updates to the enterprise ordering portal 106 (such as order being processed, inventory back-order information, order completion, shipping information, etc.). The POS platform 110 may also add at least some features of the alternative mobile device (such as the enterprise feature configuration for the alternative mobile device) to a service plan account of the enterprise when the order is completed. The POS platform is described further below with respect to FIG. 3.

The billing system 116 is configured to receive a notification from the POS platform 110 to compete the order processing. Responsive the notification, the billing system 116 may send an inventory distribution request to the device warehouse 122 to fulfill the order. The billing system 116 may also store an indication of the completed order. The billing system 116 is configured store billing and account information associated with the enterprise.

The device warehouse 122 stores mobile devices which may be configured according to the additional/different feature(s) ordered by the associate (i.e., the alternative device). The device warehouse 122 receives the inventory distribution request from the billing system 116 and fulfills the order. The order may be fulfilled by, for example, configuring, activating and/or shipping the ordered product. The ordered product may be shipped to the associate or to the enterprise (for distribution to the associate).

The POS platform 110 may be configured to review enterprise and/or associate account information during pricing requests and/or during the order processing, for example from the enterprise customer database 118. The enterprise customer database 118 stores information about the enterprise and/or associates of the enterprise. For example, the enterprise customer database may contain a user name and/or password for each associate and administrator. The enterprise customer database 118 may contain additional information about each associate or the enterprise in general, such as information about the relationship between the associate and the enterprise.

The information in the enterprise customer database 118 may be used by the POS platform 110 to authenticate the user (e.g., the enterprise, the associate or the enterprise administrator) for pricing and order requests. The information in the enterprise customer database 118 may also be used to provide appropriate pricing discounts for different associates in the enterprise. For example, different associates may belong to different pricing discount levels and/or may be eligible for discounts on particular device features (while being ineligible for discounts on other device features). For example, entry-level employees, managers and business partners may belong to different discount pricing levels. As another example, entry-level employees may be eligible for discounts on specific processing features but may be ineligible for discounts on social networking features, whereas business partners may be eligible for discounts on social networking features as well as discounts for alternative devices by different manufacturers. As another example, different groups of the enterprise may be eligible for different discounts. For example, associates in a sales group may have discounts on different products (e.g., SPS systems) compared to a marketing group (e.g., social networking products) or a research and development group (e.g., processing features). In some examples, different pricing discounts may be related to different jobs (e.g., sales, engineering, management). In some examples, different levels of discounts may be provided for different products dependent upon the job of the employee. For example, sales associates may receive a 40% discount on sales-related features and a 20% discount on non-sales-related features.

The POS platform 110 may provide additional information to the billing system 116 to complete the order processing. For example, the POS platform may provide telephone number information to be associated with the ordered mobile device. The telephone number information may be received from the enterprise telephone number inventory 120. The enterprise telephone number inventory 120 stores information associated with telephone numbers (i.e., mobile directory numbers (MDNs)) of mobile devices.

The SP platform 112 is configured to provide a token to the POS platform 110 associated with an order. The SP platform 112 is also configured to receive a transaction request form from the associate station 104 via a secure link (having the token provided to the POS platform 110). Upon verification of the token in the secure link, the SP platform is configured to open a secure transaction processing path for the associate and to perform secure transaction processing with the associate, to complete payment for the order. Responsive to receiving personal information from the associate (such as name, address, personal credit card information), the SP platform 112 communicates with the payment institution 114 to complete the purchase (if the credit card information is accepted). The SP platform 112 also informs the associate whether the transaction is successful. If the transaction is unsuccessful, the associate can attempt to repeat the transaction process or to terminate the transaction process (without completing the order).

The SP platform 112 provides the POS platform 110 with a transaction completion notification when the transaction is successful. The POS platform 110 may store the order information with an indication that the order is pending, until a transaction completion notification is received from the SP platform 112. In an example, the POS platform 110 may store the pending order indication for a predetermined period of time. If no transaction completion notification is received from the SP platform 112 after the predetermined period of time has expired, the POS platform 110 removes the pending order information. In some examples, no notification is provided to the enterprise ordering portal 106 when an order is abandoned (i.e., no transaction completion notification is received from the SP platform 112). In other examples, the POS platform 110 notifies the enterprise ordering portal 106 when the predetermined period of time has expired and no transaction completion notification has been received from the SP platform 112.

In this manner, the SP platform 112 is used by the associate to produce a separate and secure transaction flow for credit card authentication and processing (via the secure link between the associate station 104 and the SP platform 112) that excludes the enterprise from any view of the associate's transaction content. The enterprise is also excluded from review of an unsuccessful transaction outcome should the associate desire to cancel the order based on adverse financial feedback (e.g., declined card, etc.) This is because the SP platform 112 provides the POS platform 110 with successful transaction completion notification (and not an unsuccessful transaction indication). The SP platform 112 is discussed further below with respect to FIG. 4.

The payment institution(s) 114 includes any suitable institution that authenticates payments and secure transactions to financial institutions. In some examples, the SP platform 112 may communicate with a third party 3-D Secure platform (such as Cardinal Commerce) to authenticate the credit card information (if the credit card is enrolled in 3-D Secure payment protocol). The SP platform 112 may use 3-D Secure information obtained through the third party platform to submit the final transaction information to the payment institution 114.

Figure 2:
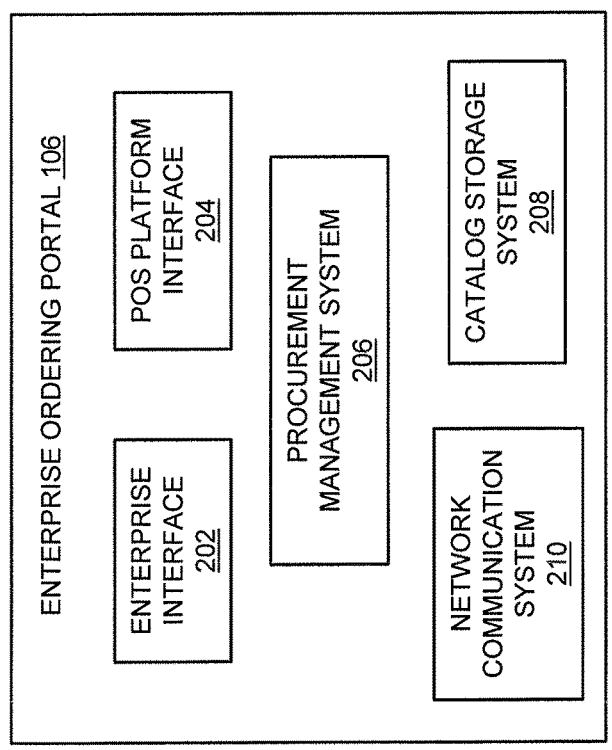
FIG. 2 is a high-level functional block diagram of an example of an enterprise ordering portal shown in FIG. 1.

FIG. 2 illustrates an example of an enterprise ordering portal 106. The enterprise ordering portal 106 includes an enterprise interface 202, a POS platform interface 204, a procurement management system 206, a catalog storage system 208 and a network communication system 210. Although not shown in FIG. 2, the enterprise interface 202, the POS platform interface 204, the procurement management system 206, the catalog storage system 208 and the network communication system 210 may be coupled together by a data and control bus.

The enterprise interface 202 is used by the associate (via the associate station 104) to review and select alternative mobile devices to enterprise-approved baseline mobile devices. In addition, the enterprise interface 202 is used by the associate to place purchase requests and review pricing for selected alternative mobile devices. The enterprise interface 202 is also used by the associate to submit order placement requests for selected alternative mobile devices. The enterprise interface 202 is also used to initiate a disposition request for the enterprise administrator (via the enterprise administrator station 102) responsive to the associate's order placement request and to submit orders to the POS platform 110. The enterprise interface 202 is also used to present order status updates from the POS platform 110.

The enterprise interface 202 is configured by the enterprise to present any desired text, images, video and/or audio for presentation to the associate and enterprise administrator. The enterprise interface 202 is also configured to receive information entered by the associate and administrator via any suitable interface (e.g., a text interface, a speech-to-text interface, via a pointing device-type interface, etc.).

The POS platform interface 204 is configured to submit pricing requests (such as for cost differentials that may be paid by the associate) for alternative devices (selected by the user via the enterprise interface 202) and to submit orders to the POS platform 110. The POS platform interface 204 is also configured to receive order status notifications from the POS platform interface 204 that may be presented to the associate and/or the associate administrator by the enterprise interface 202 (via associate station 104 and enterprise administrator station 102, respectively). The POS platform interface 204 is configured to communicate with the POS platform 110 via any suitable secure communication protocol. In an example, the POS platform interface 204 and the POS platform 110 communicate using a virtual private network (VPN) and/or a Hypertext Transfer Protocol Secure (HTTPS) protocol (shown in FIG. 5).

The catalog storage system 208 stores one or more catalogs of enterprise-approved baseline mobile devices and additional/different device features (or devices) that may be purchased by the associate (as an alternative mobile device to the approved baseline mobile devices). The baseline mobile devices and alternative mobile devices may be made available for selection by associates via the enterprise interface 202. The information in the catalog may also include information that causes a set of approved baseline mobile devices and available device features (for alternative devices) that are offered to the associate to vary depending upon the associate. In other configurations, the catalog storage system 208 may be located elsewhere, such as on a separate server or as part of the service provider 124.

Procurement management system 206 is configured to manage some or all of the operations of the enterprise ordering portal 106. For example, the procurement management system 206 may be configured to authenticate each associate and administrator before granting access to any of the services or information within the enterprise ordering portal 106. The procurement management system 206 is also configured to generate pricing requests, disposition requests and order requests (for submission to the POS platform 110) based on selections by the associate and concurrence from the enterprise administrator via the enterprise interface 202. In addition, the procurement management system 206 is configured to provide information received from the POS platform 110 for presentation via the enterprise interface 202.

The network communication system 210 is configured to allow the enterprise ordering portal 106 to communicate with one or more computer networks, such as the Internet 108. The network communication system 210 may include any type of network communication device or devices such as a network interface card.

Figure 3:
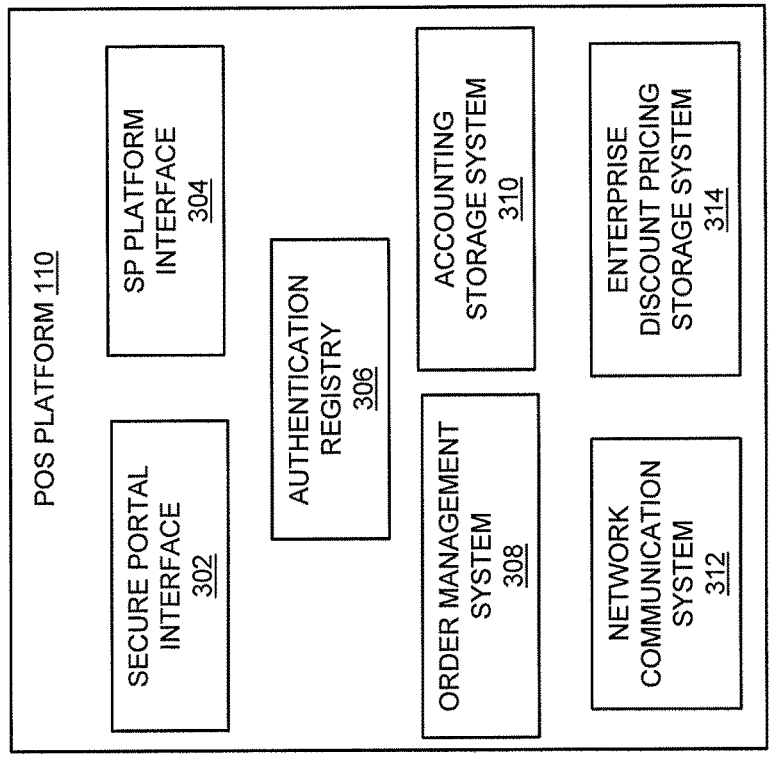
FIG. 3 is a high-level functional block diagram of an example of a point of sale (POS) platform shown in FIG. 1.

FIG. 3 illustrates an example of a POS platform 110. The POS platform includes a secure portal interface 302, an SP platform interface 304, an authentication registry 306, an order management system 308, an accounting storage system 310, a network communication system 312 and an enterprise discount pricing storage system 314. Although not shown in FIG. 3, the secure portal interface 302, the SP platform interface 304, the authentication registry 306, the order management system 308, the accounting storage system 310, the network communication system 312 and the enterprise discount pricing storage system 314 may be coupled together by a data and control bus.

The secure portal interface 302 is configured to receive requests from the enterprise ordering portal 106 (via the POS platform interface 204) and to provide responses to the enterprise ordering portal 106 according to a suitable secure communication protocol. In an example, the secure portal interface 302 and the POS platform interface 204 (of the enterprise ordering portal 106) communicate using a VPN and/or an HTTPS protocol. Examples of responses provided by secure portal interface 302 to the enterprise ordering portal 106 include a pricing notification for selected device features (for alternative mobile devices), a message with a secure link for completing transaction processing by the associate, order completion status notification and order update notifications.

In one example, the secure portal interface 302 is configured to use information in the authentication registry 306 to verify the authority of the enterprise, the enterprise administrator and/or the associate to submit requests to the POS platform 110. For example, the secure portal interface 302 may compare information received in submissions from the enterprise ordering portal 106 to information in the authentication registry 306 to verify the authentication of the request.

The authentication registry 306 may store any suitable information related to the enterprise, the enterprise administrator and/or the associate which may be used for request authentication (by the secure portal interface 302) and/or for order request authentication. For example, the order management system 308 (described further below) may verify the authority of the enterprise administer who approves the order prior to proceeding with the order.

Figure 5:
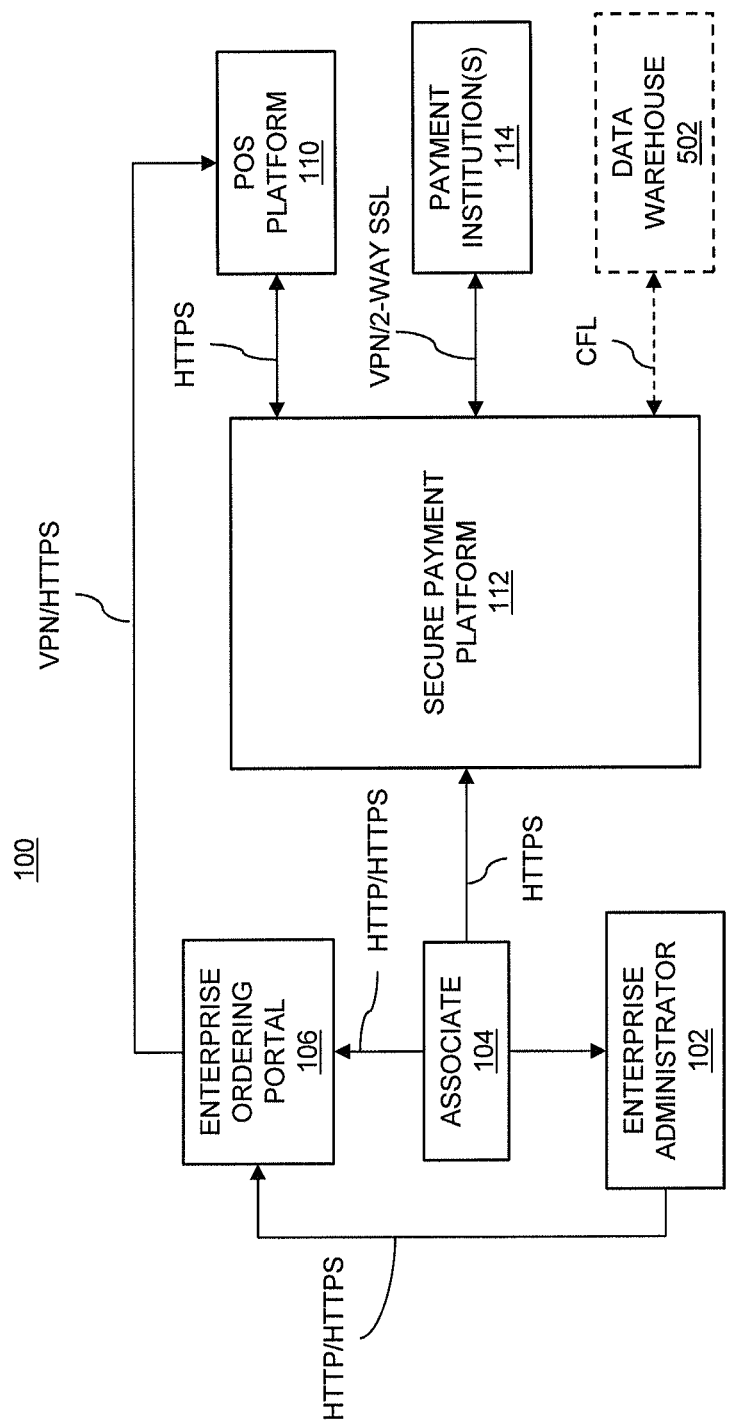
FIG. 5 is an alternate high-level functional block diagram of an example of the system shown in FIG. 1 illustrating example communication protocols between components of the system.

The SP platform interface 304 is configured to communicate with the SP platform 112 according to a suitable secure communication protocol. In an example, the SP platform interface 304 and the SP platform 112 communicate using an HTTPS protocol (as shown in FIG. 5). The POS platform 110, via the SP platform interface 304, may request and receive a token for an order from the SP platform 112 (in order to generate a secure link for transaction processing of the order). The POS platform 110, via the SP platform interface 304, may also receive a transaction completion notification from the SP platform 112, which may be used by the POS platform 110 to complete the order.

The network communication system 312 is configured to allow the POS platform 110 to communicate with one or more computer networks, such as the Internet 108. The network communication system 312 may include any type of network communication device or devices such as a network interface card.

The accounting storage system 310 is configured to store information about pending orders (where orders are submitted but no transaction completion notification has been received from the SP platform 112) and about completed orders that associates enter into. For example, the information may include the date of the order, the time of the order, the associate identity, the device features selected by the associate, whether the requested device features have been supplied, charges that have or are to be made to the associate for transaction, a date of a completed transaction, a time of a completed transaction, any indication that a transaction has been completed and/or any indication that the order has been completed. The accounting storage system 310 may also remove pending orders that are pending more than a predetermined period of time without receiving a transaction completion notification.

The enterprise discount pricing storage system 314 is configured to store information about discount pricing for the enterprise for various device features. The information may be associated with the enterprise as a whole, with different organizations within the enterprise and/or with different associates within the organization. The discount pricing may represent a cost differential between a selected alternative mobile device and a baseline mobile device.

The order management system 308 is configured to manage some or all of the operations of the POS platform 110. For example, the order management system 206 may be configured to provide pricing information to the enterprise ordering portal 106 by using information stored in the enterprise discount pricing storage system 314. The order management system 206 is also configured to provide order status completion and order status updates to the enterprise ordering portal 106, based on the transaction processing status (determined from the SP platform 112) and from inventory distribution information from the device warehouse 122.

The order management system 308 is also configured to update the order status and the transaction completion status stored in the accounting storage system 310. The order management system 308 may also review the inventory in the device warehouse 122 and/or may provide reports based on the pending and/or completed orders. The reports may be used by the service provider 124 and or by the enterprise administrator to manage the BYOD service, to provide improved employer discounts for different device features and/or to alter the configuration of enterprise-approved mobile devices. The order management system 308 is also configured to communicate with the billing system 116 to confirm transaction completion and to request completion of the order. The order management system 308 is also configured to communicate with an enterprise service plan account, to add features of the alternative device ordered by the associate to the enterprise service plan account (for payment by the enterprise) for the service provider 124, when the transaction by the associate (for payment of the cost differential between the alternative mobile device and the baseline mobile device) is confirmed. The features that are added to the enterprise's service plan account may be features associated with the baseline mobile device.

The order management system 308 is also configured to generate a secure link for the associate to perform transaction processing with the SP platform 112. To generate the secure link, the order management system 308 sends a token request to the SP platform 112. The token request includes information associated with the order (such as the order reference number, the order content, the associate name, etc.). The token received from the SP platform 112 is associated with the order. The secure link is then generated that includes the received token. The order management system 308 then sends an email message to the enterprise ordering portal 106 having the secure link. The email message includes the secure link as well as information associated with the order (such as the order reference number, the order content, the associate name, the shipping address, the name and/or contact information of the enterprise administrator who approved the order, the enterprise name, the service provider name, activation instructions, etc.).

Figure 4:
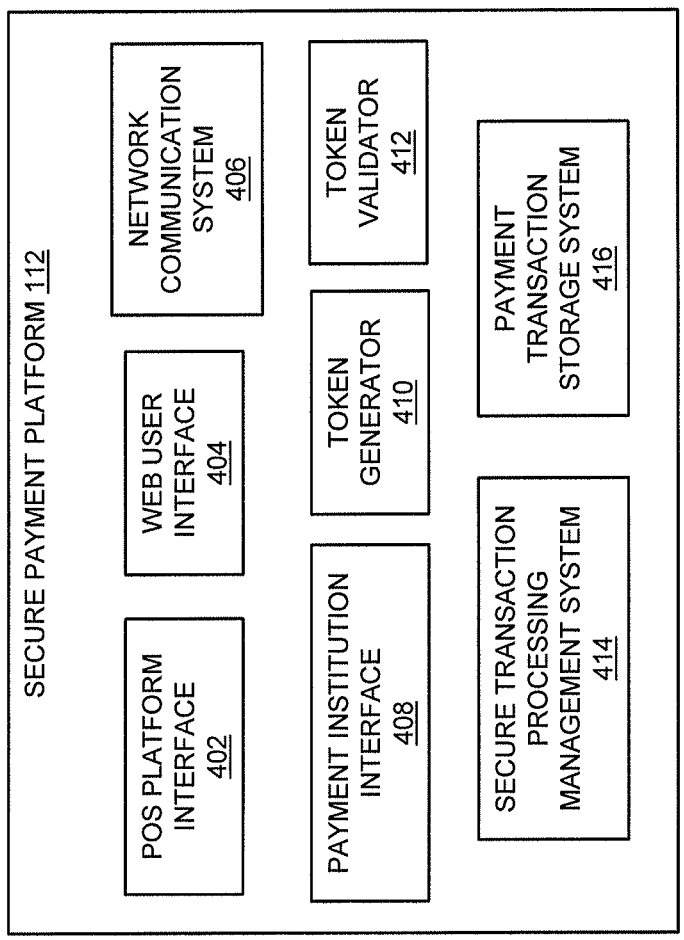
FIG. 4 is a high-level functional block diagram of an example of a secure payment (SP) platform shown in FIG. 1.

FIG. 4 illustrates an example of an SP platform 112. The SP platform includes a POS platform interface 402, a web user interface 404, a network communication system 406, a payment institute interface 408, a token generator 410, a token validator 412, a secure transaction processing management system 414 and a transaction storage system 416. Although not shown in FIG. 4, the POS platform interface 402, the web user interface 404, the network communication system 406, the payment institute interface 408, the token generator 410, the token validator 412, the secure transaction processing management system 414 and the transaction storage system 416 may be coupled together by a data and control bus.

The POS platform interface 402 is configured to receive token requests from the POS platform 110 (via the SP platform interface 304) and to provide tokens to the POS platform 110 according to a suitable secure communication protocol. In an example, the POS platform interface 402 and the SP platform interface 304 (of the POS platform 110) communicate using an HTTPS protocol (as shown in FIG. 5). The POS platform interface 402 is also configured to send a transaction completion notification to the POS platform 110 via the secure communication protocol.

The web user interface 404 is configured to receive a transaction request from the associate (via the associate station 104) using a secure link (having the token generated by the SP platform 112) according to a suitable secure communication protocol. In an example, the associate station 104 and the web user interface 404 communicate using an HTTPS protocol (as shown in FIG. 5). The web user interface 404 is also configured to send forms for entry by the associate and to receive the completed forms, via the secure link, to perform transaction processing for the order.

The network communication system 406 is configured to allow the SP platform 112 to communicate with one or more computer networks, such as the Internet 108. The network communication system 406 may include any type of network communication device or devices such as a network interface card.

The payment institute interface 408 is configured to communicate with the payment institution(s) 114 to authenticate the credit card, complete the payment and to confirm successful payment. The payment institute interface 408 may communicate with the payment institution(s) 114 according to a suitable secure, compliant communication protocol. In an example, the secure communication protocol includes a VPN protocol and/or a two-way Secure Sockets Layer (SSL) authentication protocol (as shown in FIG. 5).

The token generator 410 is configured to generate a token that is used by the POS platform 110 to generate a secure link. The generated token may provide rights and authentication to ensure the authority of the associate accessing the SP platform 112 to perform the transaction processing. The token may be generated by any suitable encryption algorithm. In an example, the encryption algorithm includes an RSA encryption algorithm with a base-64 encoding. The token includes the order information (sent by the POS platform 110) as an encrypted string (such as RSA encrypted string). The token corresponding order information may be stored by the secure payment platform 112, for example, by the transaction storage system 416.

The token validator 410 is configured to validate a token received in a transaction request (from the associate station 104 via the secure link). The token validator 410 decrypts the received token using the appropriate decryption key (associated with the generated token). The token validator 410 validates the decrypted token against the order information stored in the transaction storage system 416 (for the generated token). If the information in the decrypted token matches the stored information, the transaction processing may proceed. Otherwise, the transaction process is terminated.

The secure transaction processing management system 414 is configured to manage some or all of the operations of the SP platform 112. For example, the secure transaction processing management system 414 may be configured to control generation and distribution of tokens, control validation of received tokens, perform transaction processing with the associate station 104 and communicate with the payment institution(s) 114 to authenticate the credit card and to complete payment for the order. The secure transaction processing management system 414 is also configured to send successful transaction completion notifications to the POS platform 110 for completion of the order and to store payment transaction details in the transaction storage system 416.

The transaction storage system 416 is configured to store generated token information (e.g., the token, the encryption key and/or a decryption key), order information associated with the token, and payment transaction details. The payment transaction details may include the date of the transaction, the time of the transaction, the associate identity, the associate's credit card information, other information regarding the associate required to complete the transaction, an indication of successful or failed payment, etc. In an example, the transaction details that are stored may be information stored according to payment card industry (PCI) guidelines.

In some examples, transaction details stored in the transaction storage system 416 may be provided to a data warehouse (such as the data warehouse 502 shown in FIG. 5) for reporting of successful transaction completion status for orders. The SP platform 112 may use any suitable scripting language to access data for multiple orders stored in the data warehouse at any predetermined time and to complete processing of the accessed data (such as for payment processing and/or transaction reporting). In an example, the scripting language includes a context-free language (CFL).

FIG. 5 is an example of the system 100 further illustrating the example communication protocols between various components of the system. As shown in FIG. 5, the associate station 104, the enterprise ordering portal 106, the POS platform 110 and the payment institution(s) 114 all communicate via a secure communication protocol (e.g., HTTPS VPN and/or two-way SSL). In the example, the enterprise administrator station 102 and the associate station 104 may communicate via HTTP and/or via HTTPS.

Figure 6A:
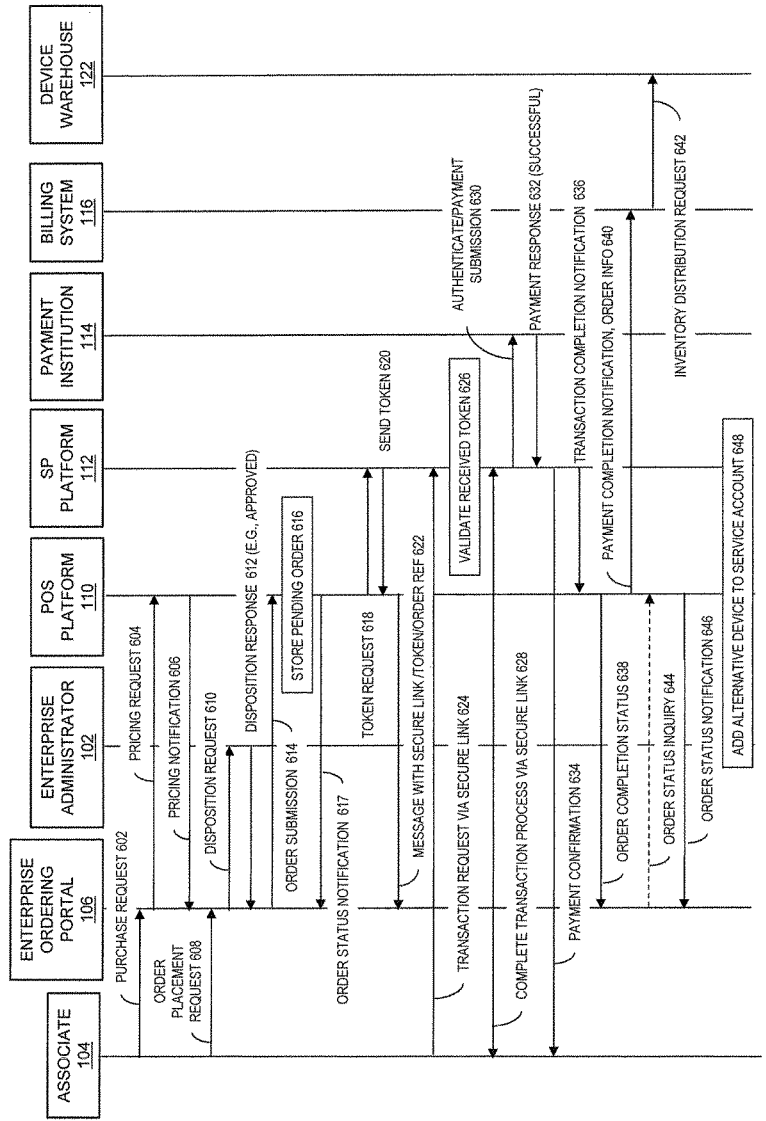
FIG. 6A is a signal flow diagram useful in understanding an example of secure associate BYOD ordering and transaction processing, with successful payment.
Figure 6B:
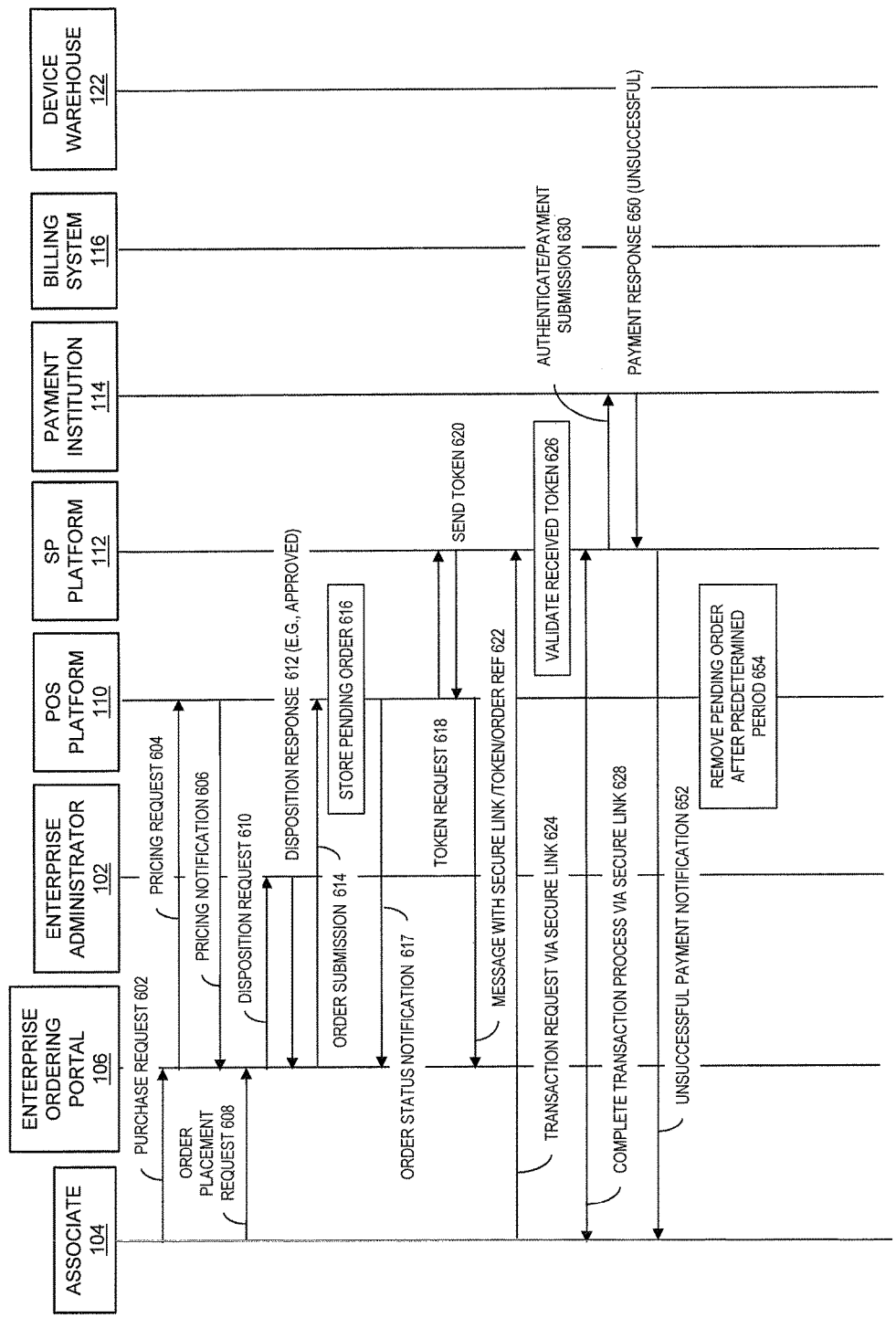
FIG. 6B is a signal flow diagram useful in understanding an example of secure associate BYOD ordering and transaction processing, with unsuccessful payment.

FIGS. 6A and 6B are call flow diagrams illustrating secure associate BYOD ordering and transaction processing. In particular, FIG. 6A illustrates an example of successful payment and subsequent order completion; and FIG. 6B illustrates an example of unsuccessful payment and pending order removal. In the examples shown in FIGS. 6A and 6B, the enterprise ordering portal 106 offers enterprise-approved baseline mobile devices and alternative mobile devices created and controlled by the enterprise. Any applicable associate standing requirements and gating elements are maintained by the enterprise through the enterprise ordering portal 106. In the examples, it is assumed that the associate currently has approved service for the service provider through the enterprise.

In FIG. 6A, the call flow includes an interaction between the associate station 104, the enterprise ordering portal 106, the enterprise administrator station 102, the POS platform 110, the SP platform 112, the payment institution 114, the billing system 116 and the device warehouse 122. These applications were described in detail with respect to FIGS. 1-5. Therefore, for the sake of brevity, they are not described here in more detail.

The process begins with an associate, via the associate station 104, initiating a purchase request 602 to the enterprise ordering portal 106 to purchase an alternative device (i.e., having additional/different features where a cost differential between the alternative mobile device and the baseline mobile device is payable by the associate), and to have at least some features of the alternative device added to the corporate service plan account to manage the monthly service payment obligations. The associate may select the alternative device for the purchase request 602 by interaction with the enterprise ordering portal 106. Responsive to the purchase request 602, the enterprise ordering portal 106 generates a pricing request 604 including purchase order details. The pricing request 604 is submitted to the POS platform 110.

Upon receipt of the pricing request 604, the POS platform 110 evaluates purchase order details in the pricing request 604, calculates the total cost for the transaction (i.e., the cost differential. For example, the total cost may include additional device features cost and applicable taxes. The POS platform 110 returns the calculated cost elements (i.e., the cost differential) to the enterprise ordering portal 106, for review with the associate, as pricing notification 606.

The associate, via communication between the associate station 104 and the enterprise ordering portal 106, reviews the pricing notification 606. The associate can continue the order placement and transaction if so desired by sending an order placement request 608 to the enterprise ordering portal 106. Alternatively, the associate can terminate the order placement by providing no further response to the enterprise ordering portal 106 or providing a request to terminate the process (not shown in FIG. 6A).

Responsive to the order placement request 608 from the associate terminal 104, the enterprise ordering portal 106, sends a disposition request 610 to the enterprise administrator (via the enterprise administrator station 102) to approve or reject the order request. The disposition request 610 may include the order purchase details and/or the pricing information for the purchase order (received in the pricing notification 606). Responsive to the disposition request 610, the enterprise administrator may review the order details and/or pricing information and send a disposition response 612 to the enterprise ordering portal 106. In the example shown in FIG. 6A, the disposition response 612 is an approval of the associate's order. Although not shown, the disposition response may include a rejection of the associate's order. In this case, the associate may be notified by the enterprise ordering portal 106 that the order is rejected by the enterprise administrator, and the ordering process may be terminated. In some examples, the notification to the associate that the order is rejected by the enterprise administrator may include an explanation of the order rejection.

FIG. 6A (and FIG. 6B) illustrates one example of order placement review by the enterprise (via disposition response 612 from the enterprise administrator). In other examples, the enterprise ordering portal 106 may perform an automated review of the order placement request 608, and determine whether to approve of the request 608 (e.g., based on predetermined guidelines associated with the enterprise). The enterprise ordering portal 106 may send a notification to the enterprise administrator (via enterprise administrator terminal 102) only when the order placement request 608 differs from the predetermined guidelines.

If the enterprise ordering portal 106 receives a disposition response 612 that includes an enterprise administrator approval (and the associate has requested placement of the order via order placement request 608), the enterprise ordering portal 106 sends order submission 614 to the POS platform 110. The order submission 614 includes the purchase order details. The purchase order details may include information about the order content and information regarding the associate (e.g., associate identity, associate shipping address, etc.). The purchase order details do not include any personal transaction information of the associate (such as personal credit card information, credit card billing address, etc.). The order submission 614 may also include information confirming authorization of the order by the enterprise administrator and/or information regarding the enterprise administrator (to confirm authorization of the order).

Responsive to the order submission 614, the POS platform 110 stores the pending order, at step 616. In an example, the pending order may be stored for a predetermined period of time (such as 8 days) until payment for the pending order is received. The POS platform 110 returns an order status notification 617 to the enterprise ordering portal 106. The order status notification 617 includes an order reference number which may be used to track the pending order.

The POS platform 110 sends a token request 618 to the SP platform 112. The token request 618 includes the order reference number and may include other information regarding the pending order. The SP platform 112, in response to the token request 618 generates and sends a token 620 to the POS platform 110. As an example, the token 620 may contain order details as RSA encrypted string. The SP platform 112 also stores the order reference number and any other order information at the time of the token generation.

The POS platform 110 receives the token 620 and generates a secure link having the token. The POS platform sends a message 622 that includes the secure link and the order reference number to the enterprise ordering portal 106. The message includes a request for the associate to select the secure link to complete the order transaction process.

At this point onwards, the associate, via associate station 104, interacts with the SP platform 112, which is secured via HTTPS and complies with PCI standards. Thus, the enterprise ordering portal 106 notifies the associate of the pending order using the returned order reference number and supplies the associate with a secure link to complete credit card payment. The link is used by the associate to create a secure and separate transaction process flow for 3-D secure/credit card authentication/processing that excludes the enterprise and the enterprise ordering portal 106 from any view of the transaction content or negative outcome. For example, if the associate cancels the order based on negative financial feedback (e.g., card declined, etc.).

The associate submits a transaction request 624 to the SP platform 112, by selecting the secure link in the message 622. At step 626, the SP platform 112 validates a token received in the transaction request 624. For example, the SP platform 112 may decrypt the received token using an RSA key and validate the transaction request 624 against order details stored in PS database.

If the transaction request 624 is valid, the associate will be directed to one or more secure web page for completion of a transaction process, step 628. During the transaction process, the associate is prompted to enter payment card details and any other suitable information, for example, by entering the information on one or more fields of the web page(s). Information displayed on payment web pages may contain the order number, an amount to be paid (i.e., the cost differential for the alternative mobile device) and any suitable form fields to capture payment card details.

Although not shown, if the transaction request 624 is invalid (at step 626), the transaction process may be terminated by the SP platform 112. In one example, the associate may request, through the enterprise ordering portal 106 and the POS platform 110, that a new secure link be generated to complete the transaction process.

Once the payment card details are entered into the web pages, the SP platform 112 communicates with the payment institution 114, via submission 630, to authenticate the transaction and submit the final payment to the payment institution 114.

In one example, the SP platform 112 may communicate with a 3-D Secure platform to lookup 3-D Secure enrollment status. If the payment card is enrolled in 3-D Secure, required information, such as RAReq and ACSUrL, to authenticate with a participating payment institution 114 is sent to the secure web page(s). The payment institution 114 will then prompt the associate to enter authentication details (e.g., a 3-D secure password). When the payment institution 114 successfully authenticates the associate's identity (via the authentication details), the payment institution 114 posts authenticated PARes details to TermUrl (handled by the SP platform 112). Once the authentication details is received via TermUrl, the SP platform 112 communicates with the 3-D Secure platform to get additional 3-D secure information (such as ECI, CAAV and Secure Txn ID, etc.), used for final payment submission.

The SP platform 112 submits final payment along with 3-D secure details to the payment institution 114 for payment completion (step 630). In another example, if the payment card is not enrolled in 3-D Secure, standard payment details will be submitted to the payment institution 114 in step 630.

If payment is successful, the SP platform 112 receives a successful payment response 632 from the payment institution. The SP platform 112 sends a payment confirmation 634 to the secure web page of the associate. The SP platform 112 also stores the payment transaction details, for example, according to PCI guidelines. The stored transaction details may be used, for example for auditing purpose and/or for any batch processing.

Responsive to the successful payment response 632, the SP platform 112 also sends a transaction completion notification 636 to the POS platform 110. The POS platform 110 sends an order completion status 638 (including the order reference data) to the enterprise ordering portal 106. The POS platform 110 generates a payment completion transaction notification 640 including applicable reference data, and forwards the notification 640 to the billing system 116. Responsive to the notification 640, the billing system 116 completes the alternative mobile device activation. The billing system 116 also sends an inventory distribution request 642 for fulfillment to the device warehouse 122.

The enterprise ordering portal 106 may, optionally, send an order status inquiry 644 to the POS platform 112, to check the order status. The POS platform 112, in response to order status inquiry 644 and/or when the order status changes, provides the enterprise ordering portal 106 with an order status notification 646. For example, the order status notification 646 may indicate an order completion status and pertinent shipping information for the ordered device. The enterprise ordering portal 106 may notify the associate (via the associate station 104) of any order status updates. Responsive to the transaction confirmation indication 636, the POS platform 110 also adds, at step 648, at least features of the alternative mobile device (e.g., features associated with the baseline mobile device) to a service plan account of the enterprise.

In FIG. 6B, the call flow includes an interaction between the associate station 104, the enterprise ordering portal 106, the enterprise administrator station 102, the POS platform 110, the SP platform 112 and the payment institution 114. These applications were described in detail with respect to FIGS. 1-5. Therefore, for the sake of brevity, they are not described here in more detail. FIG. 6B relates to an unsuccessful payment response (step 650). Steps 602-630 are the same as described above with respect to FIG. 6A.

In this example, responsive to the authentication/payment submission 630 by the SP platform 112 to the payment institution 114, the SP platform receives an unsuccessful payment response 650. For example, the payment card may be declined for insufficient funds or the payment card may not be authenticated. The SP platform 112 sends an unsuccessful payment notification 652 to the associate 104 via the secure web page. At this point, the associate may attempt to repeat the transaction process (by re-entering information on the web page, using a different payment card, etc.) The associate may also terminate the transaction process (without completion of the transaction), by sending some indication to the SP platform 112 via the web page.

Because the SP platform 112 does not send any indication of the unsuccessful payment response to the POS platform 110, the POS platform 110 continues to store the pending order information (stored at step 616). At step 654, the POS platform 110 may remove the stored pending order information after a predetermined period of time, if no transaction completion notification is received (such as notification 636 in FIG. 6A) within the predetermined period of time.

Figure 7A:
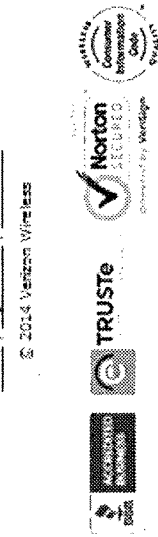
Figure 7B:

FIGS. 7A-7E are example screenshots illustrating example information that may be provided to the associate via the secure web page(s) during transaction processing. In particular, FIG. 7A illustrates an example transaction entry form; FIG. 7B illustrates an example payment confirmation message; and FIGS. 7C-7E illustrate various example transaction error messages.

As shown by the above discussion, functions relating to the secure associate BYOD ordering and transaction service may be implemented on computers connected for data communication via the components of a packet data network, operating as the various servers and/or user terminals, as shown in FIG. 1. Although special purpose devices may be used for servers operating as POS platform and secure payment platform, such devices also may be implemented using one or more hardware platforms intended to represent a general class of data processing device commonly used to run "server" programming so as to implement the secure associate BYOD ordering and transaction functions discussed above, albeit with an appropriate network connection for data communication. User terminal devices such as 102, 104 similarly may be implemented on general purpose computers, albeit with appropriate user interface elements and programming.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g., files used for the secure associate BYOD ordering and transaction service. For each of the various server platforms, the software code is executable by the general-purpose computer that functions as a server and/or that functions as a terminal device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for the secure associate BYOD ordering and transaction service, in essentially the manner performed in the implementations discussed and illustrated herein.

Figure 8:
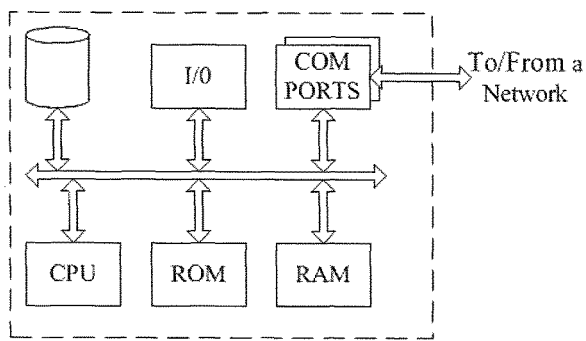
FIG. 8 is a simplified functional block diagram of a computer that may be configured as a host or server, for example, to function as the POS platform and/or the secure payment platform in the system of FIG. 1.
Figure 9:
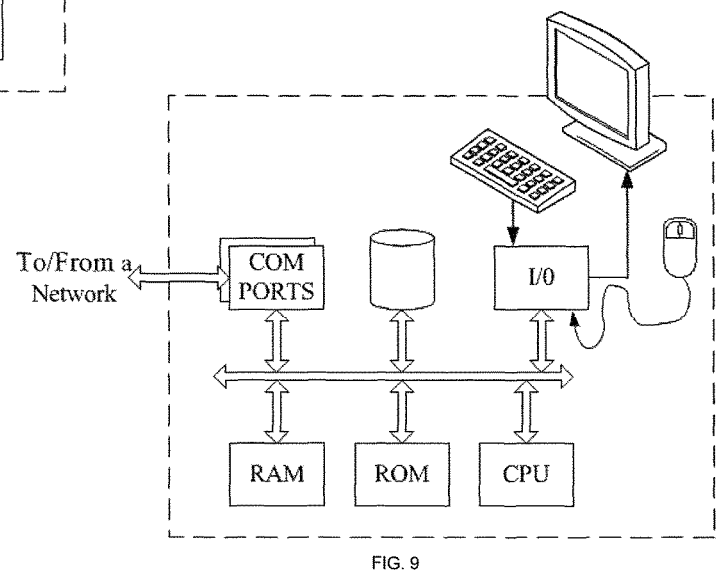
FIG. 9 is a simplified functional block diagram of a personal computer or other work station or terminal device.

FIGS. 8 and 9 provide functional block diagram illustrations of general purpose computer hardware platforms. FIG. 8 illustrates a network or host computer platform, as may typically be used to implement a server, including the POS platform 110 and the secure payment platform 112. FIG. 9 depicts a computer with user interface elements, as may be used to implement a personal computer or other type of work station or terminal device, although the computer of FIG. 9 may also act as a server if appropriately programmed. It is believed that the general structure and general operation of such equipment as shown in FIGS. 8 and 9 should be self-explanatory from the high-level illustrations.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 9). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, aspects of secure associate BYOD ordering and transaction service outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms. Non-volatile storage media include, for example, optical or magnetic disks, such as any of the storage devices in any computer(s) or the like, such as may be used to implement the aspects shown in the drawings. Volatile storage media include dynamic memory, such as main memory of such a computer platform. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge. Many of these forms of non-transitory computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

APPENDIX: ACRONYM LIST

The description above has a large number of acronyms to refer to various devices, messages and system components. Although generally known, use of several of these acronyms is not strictly standardized in the art. For the convenience of the reader, the following list correlates terms to acronyms, as used by way of example in the detailed description above.
BYOD—Buy Your Own Device
CD-ROM—Compact Disk Read Only Memory
CFL—Context-Free Language
CPU—Central Processing Unit
DVD—Digital Video Disk
DVD-ROM—Digital Video Disk Read Only Memory
EPROM—Erasable Programmable Read Only Memory
FLASH-EPROM—Flash Erasable Programmable Read Only Memory
HTTP—Hypertext Transfer Protocol
HTTPS—Hypertext Transfer Protocol Secure
MDN—Mobile Directory Number
POS—Point of Sale
PROM—Programmable Read Only Memory
RAM—Random Access Memory
ROM—Read Only Memory
SP—Secure Payment
SPS—Satellite Positioning System
SSL—Secure Sockets Layer
TEM—Telephone Expense Management
VPN—Virtual Private Network

What is claimed is:
1. A method comprising:
receiving by an order processing platform device of a service provider and from an enterprise portal device via a network, an order request for an associate of an enterprise customer,
the order request including an order for an alternative mobile device that is different from a baseline mobile device approved by the enterprise customer,
the alternative mobile device being available for purchase by the associate at a cost different from the baseline mobile device,
the cost being based on a predetermined enterprise discount;
sending, by the order processing platform device and to a secure payment (SP) platform device, a token request, the token request including information associated with the order;
receiving, by the order processing platform device and from the SP platform device, a token based on sending the token request,
the token including an RSA encrypted string;
generating, by the order processing platform device and based on receiving the token, a secure link having the token;
sending, by the order processing platform device and to the enterprise portal device via the network, a message for the associate,
the message including the secure link;
the secure link being used to receive payment information from the associate,
the payment information being associated with the cost;
receiving, by the order processing platform device and from the SP platform device, a transaction confirmation indication based on the token being decrypted using an RSA key associated with the RSA encrypted string and based on the payment information being accepted by a payment institution;
generating, by the order processing platform device and based on receiving the transaction confirmation indication, a payment completion transaction notification;
forwarding, by the order processing platform device and to a billing device, the payment completion transaction notification; and
adding, by the order processing platform, at least one or more features of the alternative mobile device to a service account of the enterprise customer for the service provider based on receiving the transaction confirmation indication.

2. The method of claim 1, further comprising:
sending a request to a device warehouse to at least one of distribute or activate the alternative mobile device responsive to the transaction confirmation indication.

3. The method of claim 1, further comprising:
storing an order content of the order request for a predetermined period of time; and
removing the ordered content based on the predetermined period of time expiring and the transaction confirmation indication not being received.

4. The method of claim 1,
wherein transaction information, associated with the associate, is stored responsive to the payment information being accepted, and
wherein the enterprise customer is excluded from access to the transaction information.

5. The method of claim 1, further comprising:
sending, via the network, an order status indication to at least one of the enterprise customer or the associate.

6. The method of claim 1, further comprising:
receiving a pricing request for the alternative mobile device; and
sending a pricing notification to an enterprise responsive to the pricing request,
the pricing notification including at least one of:
the cost,
the predetermined enterprise discount, or
an identity of the associate or a group, within the enterprise, in which the associate is included.

7. The method of claim 1, wherein the order request includes an approval indication associated with an enterprise administrator for the order request;
wherein the method further comprises:
confirming that the enterprise administrator is authorized to approve the order request; and
wherein sending the message for the associate comprises:
sending the message for the associate based on confirming that the enterprise administrator is authorized.

8. The method of claim 1, wherein the alternative mobile device includes at least one of:
an additional hardware feature,
an additional application feature,
at least one feature included in the baseline mobile device, or
a same type of device of a different manufacturer.

9. A system comprising:
an order processing platform device to:
receive, from an enterprise portal device and via a network, an order request for an associate of an enterprise customer,
the order request including an order for an alternative mobile device that is different from a baseline mobile device approved by the enterprise customer,
the alternative mobile device being available for purchase by the associate at a cost different from the baseline mobile device,
the cost being based on a predetermined enterprise discount,
send, to a secure payment (SP) platform device, a token request,
the token request including information associated with the order,
receive, from the SP platform device, a token based on sending the token request,
the token including an RSA encrypted string,
generate, based on receiving the token, a secure link having the token,
send, via the network, a message for the associate,
the message including the secure link,
the secure link being used to receive payment information from the associate,
the payment information being associated with the cost,
receive, from the SP platform device, a transaction confirmation indication based on the token being decrypted using an RSA key associated with the RSA encrypted string and based on the payment information being accepted by a payment institution,
generate, based on receiving the transaction confirmation indication, a payment completion transaction notification,
forward, to a billing device, the payment completion transaction notification, and
add at least one or more features of the alternative mobile device to a service account of the enterprise customer for a service provider based on receiving the transaction confirmation indication.

10. The system of claim 9, wherein the baseline mobile device includes at least one of:
a mobile phone,
a portable handset,
a smart-phone,
a personal digital assistant,
a satellite positioning system device, or
a device having a wireless connection.

11. The system of claim 9, wherein the order processing platform device is further to:
store an order content of the order request for a predetermined period of time, and
remove the order content based on the predetermined period of time expiring and the transaction confirmation indication not being received.

12. The system of claim 9, wherein the order request includes an approval indication associated with an enterprise administrator for the order request,
wherein the order processing platform device is further to:
confirm that the enterprise administrator is authorized to approve the order request, and
wherein the order processing platform, when sending the message for the associate, is to:
send the message for the associate based on confirming that the enterprise administrator is authorized.

13. The system of claim 9, wherein a communication with the payment institution is performed via a 3-D Secure platform according to a 3-D Secure payment protocol.

14. The system of claim 9, wherein the alternative mobile device includes at least one of:
an additional hardware feature,
an additional application feature,
a feature included in the baseline mobile device, or
a same type of device of a different manufacture.

15. A non-transitory computer readable medium storing instructions, the instructions comprising:
one or more instructions, that when executed by a processor of a processing platform device, cause the processor to:
receive, from an enterprise portal device via a network, an order request for an associate of an enterprise customer, the order request including an order for an alternative mobile device that is different from a baseline mobile device approved by the enterprise customer,
  the alternative mobile device being available for purchase by the associate at a cost different from the baseline mobile device,
    the cost being based on a predetermined enterprise discount;
send, to a secure payment (SP) platform device, a token request,
  the token request including information associated with the order;
receive, from the SP platform device, a token based on sending the token request,
  the token including an RSA encrypted string;
generate, based on receiving the token, a secure link having the token;
send, to the enterprise portal device via the network, a message for the associate,
  the message including the secure link,
    the secure link being used to receive payment information from the associate,
      the payment information being associated with the cost;
receive, from the SP platform device, a transaction confirmation indication based on the token being decrypted using an RSA key associated with the RSA encrypted string and based on the payment information being accepted by a payment institution;
generate, based on receiving the transaction confirmation indication, a payment completion transaction notification;
forward, to a billing device, the payment completion transaction notification; and
add at least one or more features of the alternative mobile device to a service account of the enterprise customer for a service provider, based on receiving the transaction confirmation indication.

16. The non-transitory computer readable medium of claim 15, wherein the one or more instructions, when executed by the processor, are further to:
  request at least one of distribution or activation of the alternative mobile device responsive to the transaction confirmation indication.

17. The non-transitory computer readable medium of claim 15, wherein the one or more instructions, when executed by the processor, are further to:
  store an order content of the order request for a predetermined period of time; and
  remove the stored ordered content based on the predetermined period of time expiring and the transaction confirmation indication not being received.

18. The non-transitory computer readable medium of claim 15, wherein the one or more instructions, when executed by the processor, are further to:
  store transaction information associated with the associate based on the payment information being received and a response by the payment institution,
    the transaction information being stored such that an enterprise is excluded from access to the transaction information.

19. The method of claim 1, further comprising:
sending an order status notification based on receiving an order status inquiry.

20. The system of claim 9, wherein a plurality of different associates are associated with a plurality of different eligibility levels,
  each of the plurality of different eligibility levels providing:
    a different alternative mobile device choice, or
    a different cost differential for the alternative mobile device.

* * * * *